(12) United States Patent
Nakanishi

(10) Patent No.: US 6,336,864 B1
(45) Date of Patent: Jan. 8, 2002

(54) GAME MACHINE, METHOD FOR CHECKING HIT AND INFORMATION STORAGE MEDIUM

(75) Inventor: Kensuke Nakanishi, Tokyo (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/601,983

(22) PCT Filed: Dec. 8, 1999

(86) PCT No.: PCT/JP99/06869
§ 371 Date: Aug. 9, 2000
§ 102(e) Date: Aug. 9, 2000

(87) PCT Pub. No.: WO00/33928
PCT Pub. Date: Jun. 15, 2000

(30) Foreign Application Priority Data

Dec. 9, 1998 (JP) ............................................ 10-375004

(51) Int. Cl.$^7$ ................................................ A63F 13/00
(52) U.S. Cl. .............................. 463/33; 463/31; 463/34; 463/6; 434/69; 434/62; 434/64; 434/68
(58) Field of Search ....................... 463/1–6, 7, 31–34, 463/53; 345/418, 419, 435, 958, 959; 434/62–65

(56) References Cited

U.S. PATENT DOCUMENTS 5,515,489 A * 5/1996 Yaeger ........................ 395/152
5,572,634 A * 11/1996 Duluk, Jr. .................... 395/119
6,128,018 A * 10/2000 Nakajima .................... 345/419
6,171,186 B1 * 1/2001 kurosawa et al. ............. 463/31

FOREIGN PATENT DOCUMENTS

JP    2747427    5/1998
JP    2975336    11/1999

* cited by examiner

Primary Examiner—Jessica J. Harrison
Assistant Examiner—Alex F. R. P. Rada, II
(74) Attorney, Agent, or Firm—Dellett and Walters (57) ABSTRACT

It is an object of the present invention to provide a game apparatus allowing for an accurate determination of a collision of a player's moving object traveling at high speed with an obstacle. A relative coordinate calculation section 21 calculates the relative coordinates of another movable object by using the position of the player's movable object as the origin. A relative speed calculation section 22 calculates the relative speed of the player's moving object and the other movable object. If the relative speed exceeds a predetermined value, a hit check position decision section 23 equally divides a distance traveled by the player's moving object at the relative speed in ⅟₆₀ seconds into segments, each of the segments not exceeding the length L of the player's moving object, to determine the number of hit checks, and sets one or more hit check positions between the player's moving object and the other movable object on their trajectory. A hit check section 25 performs a hit check between the player's moving object and the other movable object at each of the set intermediate hit check positions.

10 Claims, 10 Drawing Sheets

PRIOR ART

FIG. 15

PRIOR ART

GAME MACHINE, METHOD FOR CHECKING HIT AND INFORMATION STORAGE MEDIUM

FIELD OF THE INVENTION

The present invention relates to a game apparatus and collision determination method for determining a collision of a moving object operated by a player with an obstacle, and information storage medium.

BACKGROUND ART

Driving game apparatuses are known in which a player viewing the game images displayed on the display operates a movable object and races the movable object with other movable objects. In such a game apparatus, when the moving object operated by the player hit against another moving object or side walls or the like, the moving object temporarily slows down or spins, or other representations are provided to produce a feel similar to a real race.

To provide these representation after a collision, conventional game apparatuses determines a collision of the player's moving object ("player's vehicle") with another moving object ("other vehicle") or obstacles such as side walls (the determination of the collision is hereinafter called a "hit check"). A prior-art hit check is disclosed in Japanese Patent Laid-Open No. 8-131656 titled "Game apparatus and collision determination method." In this prior art, whether the player's vehicle collides with an obstacle is determined at predetermined time intervals (for example, at intervals of 1/60 seconds, which is the display intervals of a game image).

Figure 14:
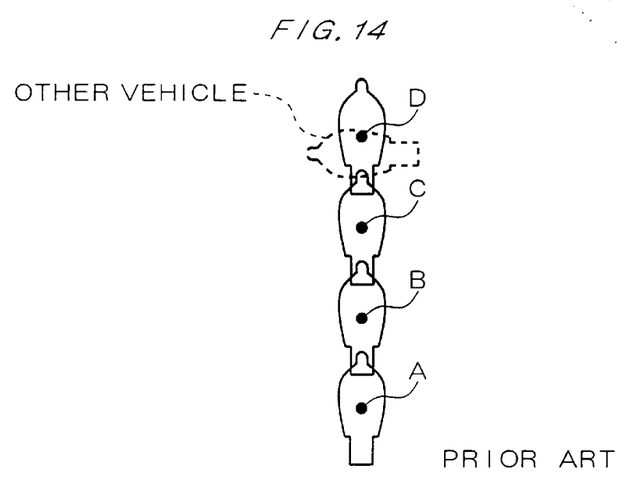
FIG. 14 shows an example of a prior-art hit check.
Figure 15:
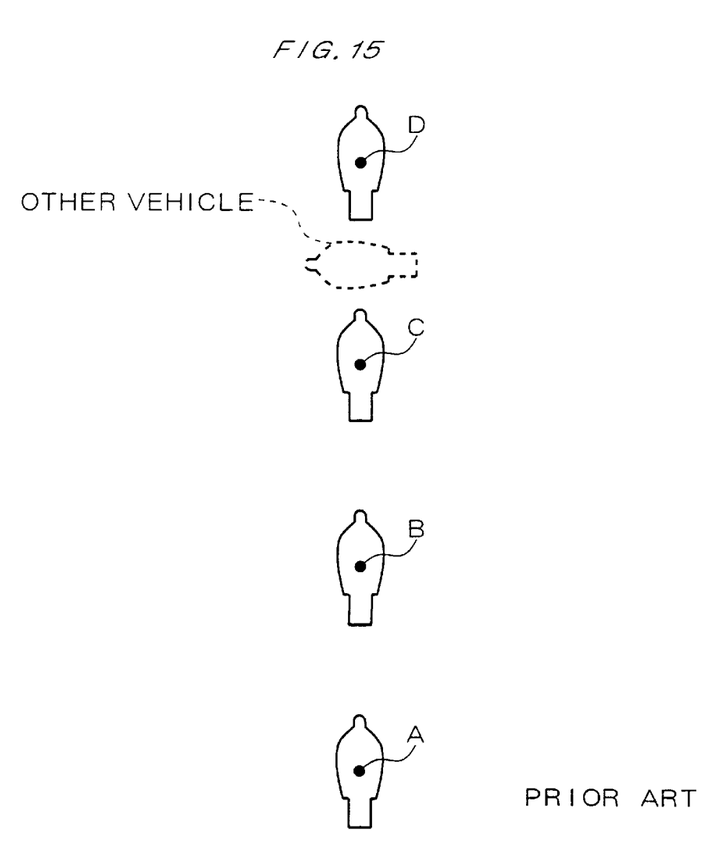
FIG. 15 shows another example of a prior-art hit check.

However, such a conventional hit check performed at predetermined time intervals may not allow for determining a collision accurately when the moving object runs at high speeds. FIGS. 14 and 15 show an example of a conventional hit check method in which whether the player's vehicle collides with another vehicle at a halt ahead of the player's vehicle is determined at intervals of 1/60 seconds.

For example, if the velocity of the player's vehicle is low and travels a distance less than or equal to the length of the vehicle in 1/60 seconds, positions A to D of the player's vehicle at intervals of 1/60 seconds will be in a continuous region and portions where the player's vehicle overlap the other vehicle will be created as shown in FIG. 14, therefore whether a collision occurs or not can be accurately determined. However, if the velocity of the player's vehicle is fast and runs a distance longer than the length of vehicle in 1/60 seconds, positions A to D of the player's vehicle at intervals of 1/60 seconds will not be in a continuous region and gaps will be created between them as shown in FIG. 15. If the other vehicle comes into one of these gaps, it cannot be determined that the collision of the player's vehicle with the other vehicle has occurred even though it actually occurred, because the overlap of the player's vehicle with the other vehicle is not created, and thus the player's vehicle passes through the other vehicle. Also, if the other vehicle travels too fast with respect to the player's vehicle, accurate determination of a collision cannot be performed and the player's vehicle may pass through the vehicle.

SUMMARY OF THE INVENTION

The present invention is invented in view of these problems, and it is an object of the invention to provide a game apparatus, collision determination method, and information storage medium which allow an accurate determination of a collision of a movable object moving at high speed.

The game apparatus of the present invention determines by using game operation unit a collision of a player's moving object with an obstacle at an intermediate position between a position corresponding to the time at which a game image was previously displayed and a position corresponding to the time at which the image will be displayed next, during the travel of the player's moving object manipulated by using manipulation unit. Thus, even if the player's moving object collides with an obstacle at an intermediate position between the previous and the next display time of the player's moving object rather than at the previous display time and next display time of the player's moving object, while the player's moving object is traveling fast, an accurate determination of the collision can be accomplished.

Preferably, the game operation unit calculates, based on the relative distance traveled by the player's moving object and the obstacle corresponding to the display interval of the game image, the relative coordinates of the player's moving object and the obstacle used for one or more collision determinations performed at the intermediate position. by the use of collision determination position decision unit, and use the relative coordinates to determine a collision of the player's moving object with the obstacle by the use of collision determination unit. If the relative distance between the player's moving object and the obstacle which corresponds to the display interval of the game image is long, there is a possibility that the player's moving object collides with the obstacle at an intermediate position, even though the player's moving object did not collide with the obstacle at one of the display positions which exist discontinuously. In such a case, the collision of the player's moving object with the obstacle can be detected without fail by performing the collision determination at the intermediate position as well.

Preferably, the game operation unit calculates a relative speed between the player's moving object and the obstacle by using relative speed calculation unit and performs the collision determination at an intermediate position by using the collision determination position decision unit when the calculated relative speed exceeds a predetermined value. Increase in the relative speed means that the relative distance traveled by the player's moving object and the obstacle increases. Therefore, when the relative speed increases, the collision determination is performed at an intermediate position in addition to the regular collision determinations to ensure that a collision at the intermediate position is detected. When the relative speed is low, the collision determination at the intermediate position is not performed, so that the processing load for performing such determination is lightened.

Preferably, the game operation unit further includes a table memory for storing a collision distance (ds) used for determining whether the player's moving object will collides with an obstacle by relating the collision distance to the orientation ($\theta 1$) in which the obstacle is positioned with respect to the direction which the player's moving object faces and the orientation ($\theta 2$) which the obstacle faces with respect to the direction which the player's moving object faces. The collision determination unit determines that the player's moving object collides with the obstacle when the distance between the player's moving object and the obstacle with which it may collide does not exceed the collision distance ds corresponding to the same orientations $\theta 1$, $\theta 2$, so that the collision determination can be performed easily without fail by simply comparing the actual distance between the player's moving object and the obstacle with the collision distance ds, even if the player's moving object has a complicated shape.

Preferably, the game operation unit determines a collision by extracting an obstacle contained in a predetermined area centered at the player's moving object from obstacles in virtual game space to determine a collision. In particular, the predetermined area is preferably set by taking at least one of the travel velocities of the player's moving object and the obstacle into consideration. Because some obstacles are located at a position where a collision with the player's moving object cannot occur depending on the travel speed of the player's moving object, such obstacles are initially excluded from the collision determination so that the process can be simplified and the processing load on the game operation unit can be lightened.

The collision determination method of the present invention comprises the steps of: calculating, based on the relative distance traveled by the player's moving object and the obstacle in relation to the display interval of the game image, the relative coordinates of the player's moving object and the obstacle used for one or more collision determinations performed at an intermediate position(s) between a position corresponding to the previous display time of a game image and a position corresponding to the next display time of the image; and determining a collision of the player's moving object with the obstacle by using the relative coordinates. By providing these steps, even if the player's moving object collides with the obstacle at an intermediate position between the previous and the next display time of the player's moving object rather than at the previous display time or next display time of the player's moving object, while the player's moving object is moving fast, an accurate determination of the collision can be accomplished.

The information storage medium of the present invention contains a program for determining a collision of a player's moving object with an obstacle at an intermediate position between a position corresponding to the previous display time of a game image and a position corresponding to the next display time. In particular, the program preferably comprising a first program for calculating, based on the relative distance traveled by the player's moving object and the obstacle in relation to the display interval of the game image, the relative coordinates of the player's moving object and the obstacle used for one or more collision determinations performed at an intermediate position between a position corresponding to the previous display time of a game image and a position corresponding to the next display time, by executing the program contained in the information storage medium; and a second program for using the relative coordinates to determine a collision of the player's moving object with the obstacle, by executing the program contained in the information storage medium. By executing the programs contained in the information storage medium, even if the player's moving object collides with the obstacle at an intermediate position between the previous and the next display time of the player's moving object rather than at the previous display time or next display time of the player's moving object, while the player's moving object is moving fast, an accurate determination of the collision can be accomplished.

DETAILED DESCRIPTION OF THE PREFERRED EMBODIMENTS

A game apparatus of one embodiment according to the present invention is characterized by determining a collision of a motorcycle with another motorcycle not only at the positions of the motorcycles at display intervals but also at a plurality of positions along the trajectory of the motorcycles while the motorcycle as a player's moving object is moving at a high speed relative to the other motorcycle as an obstacle. The game apparatus of the embodiment according to the present invention will be described below with reference to the drawings.

Figure 1:
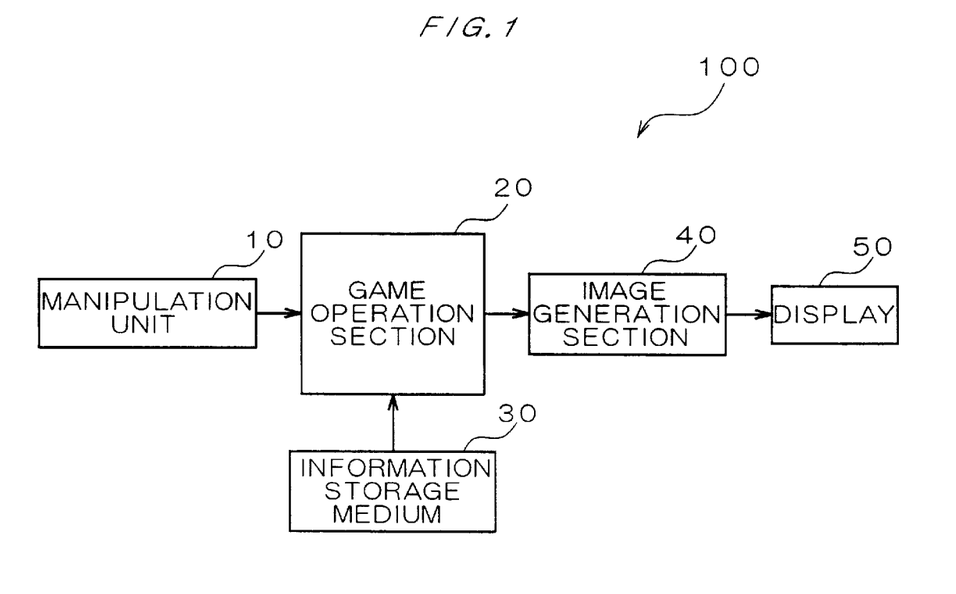
FIG. 1 shows a configuration of one embodiment of a game apparatus.

FIG. 1 shows a configuration of the game apparatus of the embodiment. The game apparatus 100 shown in the figure is used for performing a race on a virtual racing course provided in three-dimensional game space and comprises a manipulation unit 10, a game operation section 20, a information storage medium 30, an image generation section 40, and a display 50.

The manipulation unit 10 includes, like an actual motorcycle, a handlebar, a throttle grip, a brake lever, and a shift lever and outputs a signal according to the manipulation of these components to the game operation section 20.

The game operation section 20 performs game operations for running a motorcycle which is a player's moving object (hereinafter called "the player's vehicle") on a racing course provided in a predetermined three-dimensional game space based on the manipulation direction signal outputted from the manipulation unit 10 and a game program stored in the information storage medium 30. The image generation section 40 converts the three-dimensional game space into a projection plane of a predetermined viewpoint coordinate system to generate a game image. The generated image is displayed on the display 50.

The information storage medium 30 contains, among others, a program executed in the game operation section 20, image data for representing display objects, and audio data. For example, a CD-ROM disk, a game cassette, a DVD, a hard disk, and the like are used as the information storage medium for storing the game program and data in home game apparatuses. In arcade game apparatuses, ROM, hard disk, and the like are used.

Figure 2:
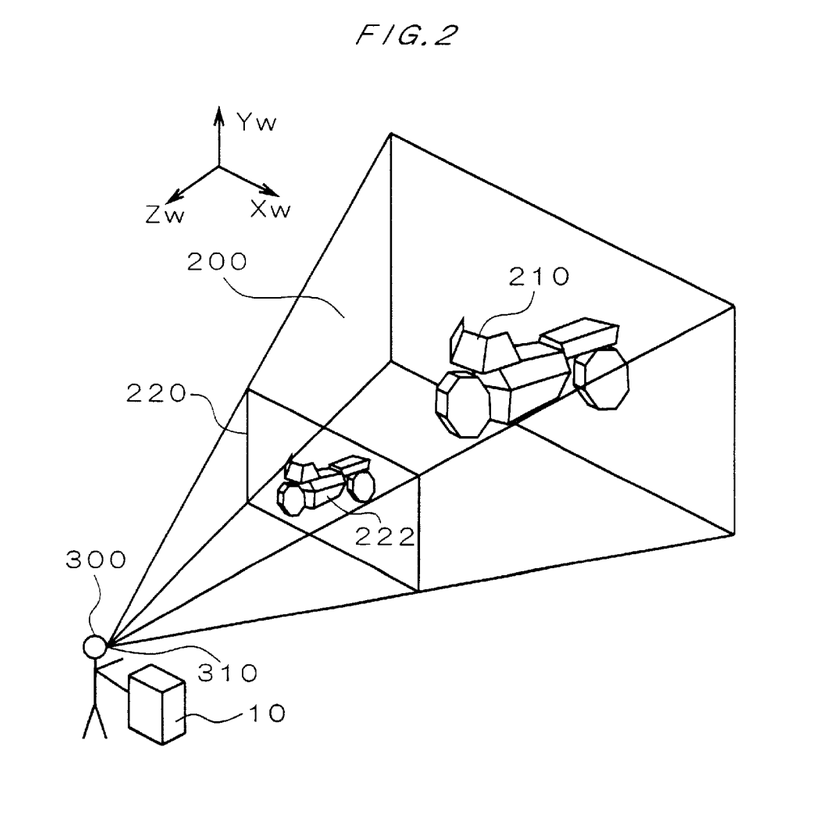
FIG. 2 shows a principle for generating a game image.

FIG. 2 shows a principle for generating a game image. As shown in the figure, the game operation section 20 disposes a three-dimensional object 210 representing a motorcycle operated by a player 300 in the three-dimensional game space 200. The information storage medium 30 contains data on a plurality of polygons making up the three-dimensional object 210. Besides the three-dimensional object 210 representing the motorcycle operated by the player 300, various three-dimensional objects representing motorcycles other than one operated by the player 300 (hereinafter called "the other motorcycle"), a racing course, side walls, buildings, mountains, a tunnel and other scenery things are disposed in the three-dimensional game space 200. Data on a plurality of polygons making up these three-dimensional objects is also stored in the information storage medium 30.

These three-dimensional objects are transformed by the image generation section 40 into perspective projection images on a perspective projection plane 220 of a viewpoint coordinate system centered at a virtual viewpoint 310 of the player 300 and displayed as a pseudo-three-dimensional image 222 on the display 50. For example, when the player 300 views the screen of the display 50 while manipulating manipulation unit 10, a view is provided to the player 300 which provides impression if the player 300 rode on the motorcycle in the three-dimensional space 200.

When the player 300 manipulates a component such as the handlebar on the manipulation unit 10 to turn or move forward the motorcycle, the game operation section 20 performs operations for changing the position and/or direction of the three-dimensional object 210 or other three-dimensional objects in the three-dimensional game space 200 based on the manipulations and the game program or the data on a plurality of polygons making up the three-dimensional objects. The three-dimensional objects the position and/or direction of which is changed are perspective-projection-transformed on the perspective projection plane 220 of the viewpoint coordinate system centered at the viewpoint 310 of the player 300 by the image generation section 40, and displayed as the pseudo-three-dimensional image 222 on the display 50 as described above.

Thus, the position/direction of the three-dimensional objects in the three-dimensional game space 200 is changed in real time by the player 300 manipulating the manipulation unit 10, so that the player 300 can have a sense of realism as if the player 300 were running really on the racing course provided in the three-dimensional game space 200.

For example, if a computer graphic technology is used, the game operation section 20 creates a geometric model of the three-dimensional object 210 by using a separate body coordinate system. That is, the geometric model of the three-dimensional object 210 is specified by positioning polygons making up the three-dimensional object 210 in the body coordinate system. The game operation section 20 also constructs the three-dimensional game space 200 by using a world coordinate system (Xw, Yw, Zw) and positions the three-dimensional object 210 represented by using a body coordinate system according to its motion model. The image generation section 40 transforms the coordinates of each three-dimensional object in the three-dimensional game space 200 into a viewpoint coordinate system in which the position of the viewpoint 310 is the origin and the direction of the line of sight is the positive direction of the Z-axis, then performs perspective projection transformation by which the viewpoint coordinate system is transformed into a screen coordinate system, which is the coordinate system of the projection plane 220. In this way, the image in the three-dimensional game space 200 within the field of view from the viewpoint 310 Is displayed on the display 50.

Figure 3:
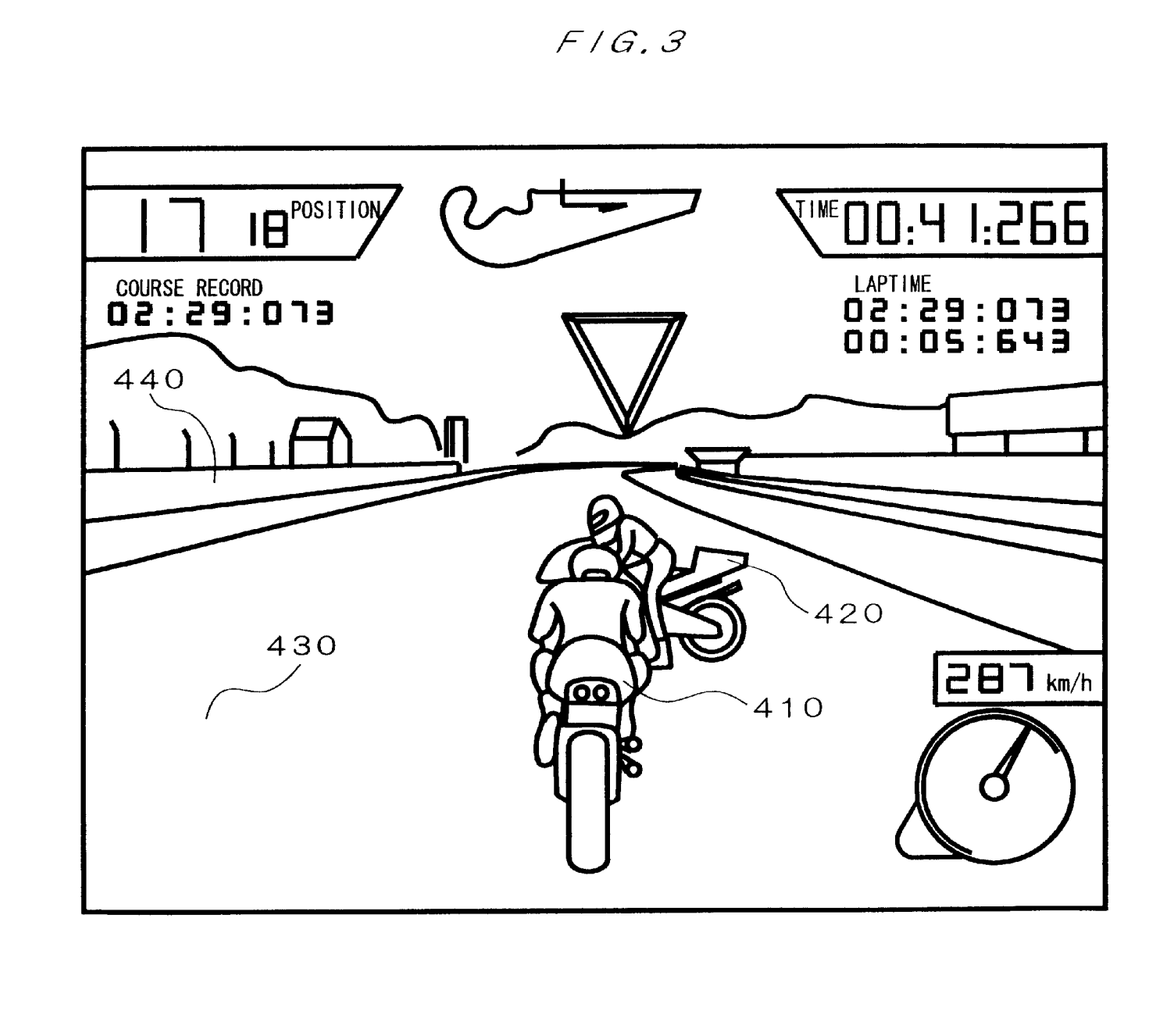
FIG. 3 shows an example of a game image.

FIG. 3 shows an example of a game image displayed on the display 50. As shown in the figure, a motorcycle (the player's vehicle) 410 operated by the player 300 is displayed in the middle of the game image. Another motorcycle (the other vehicle) 420 and various scenery images such as a racing course 430 and a side wall 440 are also displayed concurrently in the game image.

The game operation section 20 performs, besides the action for generating the above-mentioned game image, a hit check action (collision determination action) to determine whether the player's vehicle 410 collides with an obstacle such as the other vehicle 420 and performs an operation to cause the game to reflect the result of the determination. For example, in the game image shown in FIG. 3, if the player's vehicle 410 collides with the other vehicle 420 ahead of the player's vehicle 410, the speed of the player's vehicle 410 is significantly decreased. Also, the player's vehicle 410 may spin on the racing course 430 or go off the course depending on an angle at which the player's vehicle 410 hits the other vehicle 420.

Figure 4:
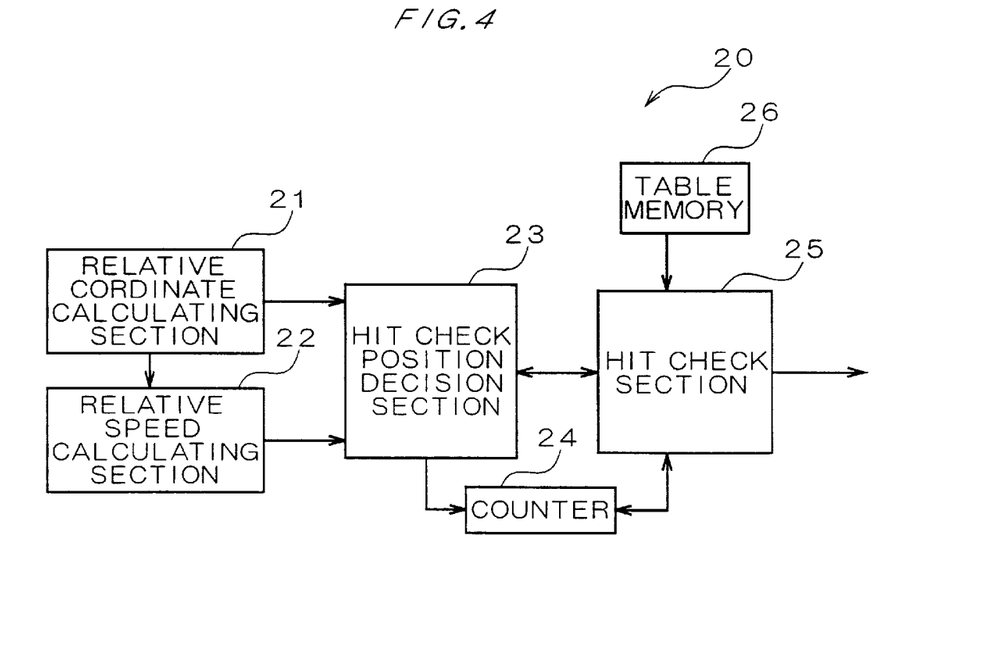
FIG. 4 shows functional blocks within a game operation section which are involved in the operation for a collision determination.

FIG. 4 shows functional blocks within the game operation section 20 which are involved in the collision determination action. As shown in FIG. 4, the game operation section 20 comprises a relative coordinate calculation section 21, a relative speed calculation section 22, a hit check position decision section 23, a counter 24, a hit check section 25, and a table memory 26.

The relative coordinate calculation section 21 transforms the coordinates of the center of gravity of the other vehicle to be hit-checked into the coordinates (relative coordinates) with respect to the center of gravity of the player's vehicle. That is, the relative coordinate calculation section 21 transforms the coordinates of the center of gravity of the other vehicle in a world coordinate system into coordinates in a local coordinate system centered at the center of gravity of the player's vehicle. The local coordinate system is established by using the length direction of the player's vehicle as the Z-axis, the width direction as the X-axis, and the height direction as the Y-axis. The relative speed calculation section 22 calculates the relative speed of the other vehicle with respect to the player's vehicle and the relative speed of the player's vehicle with respect to the other vehicle, based on the transition of the relative coordinates of the other vehicle with time calculated by the relative coordinate calculation section 21. For example, the relative velocities of the player's vehicle and the other vehicle are calculated by dividing the amount of the transition of the relative coordinates of the other vehicle obtained at every display intervals of the game image by the display interval.

Figure 5:
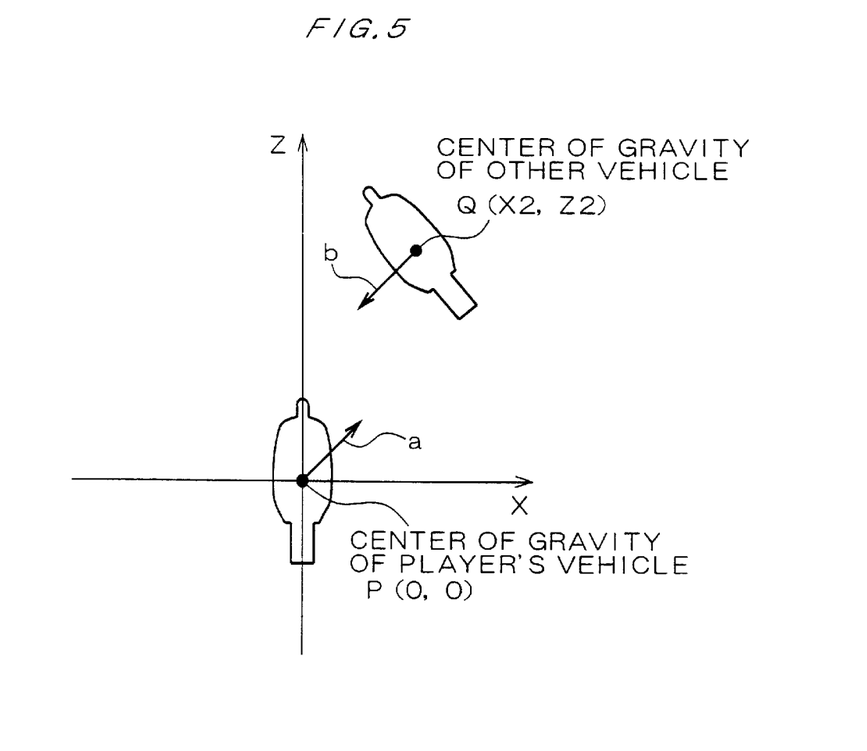
FIG. 5 shows a positional relationship between the player's vehicle and the other vehicle in a local coordinate system.

FIG. 5 shows a positional relationship between the player's vehicle and the other vehicle in the local coordinate system. As shown in FIG. 5, the center of gravity P of the player's vehicle is the origin in the local coordinate system. The center of gravity Q of the other vehicle is identified by coordinates (X2, Z2) in the local coordinate system. As shown in FIG. 5, the relative speed of the player's vehicle with respect to the other vehicle is denoted by vector a and the relative speed of the other vehicle with respect to the player's vehicle is denoted by vector b.

The hit check position decision section 23 adds one or more intermediate positions as hit check positions if the distance from the previous hit check position to the next hit check position is long. Assuming that the hit check is performed at display intervals of the game image (in the following description, assumption is that the display interval of the game image is 1/60 seconds), one or more hit checks are performed at a intermediate position(s) before each display position if the relative distance between the player's vehicle and the other vehicle changes significantly in the period from the time at which the previous game image was displayed to the time at which the next game image is to be displayed.

In particular, the hit check position decision section 23 determines whether the distance from the previous hit check position to the next hit check position is long or not by checking whether the relative speed of the player's vehicle (or the other vehicle) calculated by the relative speed calculation section 22 exceeds a predetermined value. For example, whether the value of the relative speed calculated by the relative speed calculation section 22 is such a value that the distance traveled by the player's vehicle at that relative speed during a display interval of the game image would exceed the length L (m) of the player's vehicle. In this case, the distance traveled by the player's vehicle in 1/60 seconds would exceed distance L if the relative speed of the player's vehicle is more than 60L (m/s).

If the relative speed of the player's vehicle exceeds the predetermined value, then the hit check position decision section 23 calculates the distance traveled by the player's vehicle at the relative speed calculated by the relative speed calculation section 22 and sets, as the number of hit checks, the number (n) of segments required to divide the distance equally in such a way that the length of each segment does not exceed the length (L) of the player's vehicle. The set number of hit checks is provided to the counter 24 as the count initial value.

Figure 6:
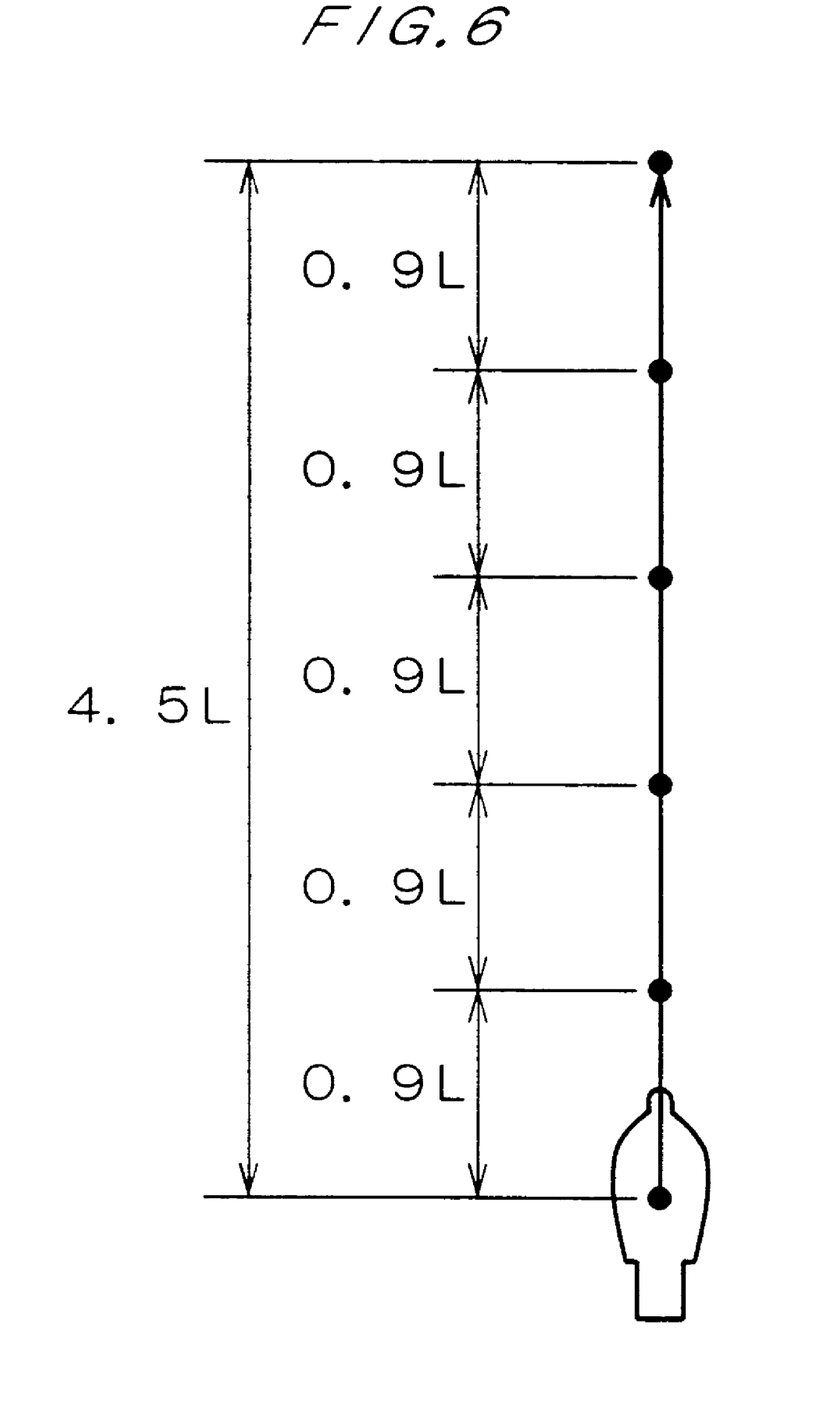
FIG. 6 is a drawing for explaining the number of hit checks set by a hit check position decision section.

FIG. 6 is a drawing for explaining the number of hit checks at intermediate positions set by the hit check position decision t section 23. In FIG. 6, an example in which the relative speed (V) of the player's vehicle is 4.5×60L (m/s) is shown. The hit check position decision section 23 calculates the relative distance traveled by the player's vehicle in 1/60 seconds based on the relative speed (V) of the player's vehicle. In the example shown in FIG. 6, the player's vehicle travels (1/60)×V=4.5L. Therefore, the number of segments is five and the count of hit checks is set at five. Because the hit checks include a conventional hit check corresponding to the display of the next game image, four hit checks at intermediate positions are added resultingly.

The hit check position decision section 23 sets hit check positions corresponding to the set count of hit checks. For example, if the count of hit checks is set at five as shown in FIG. 6, the position of the player's vehicle and the other vehicle after the player's vehicle travels at the relative speed V in (1/60)/5 seconds is set as the first hit check position. Because a local coordinate system in which the position of the player's vehicle shown in FIG. 5 is the origin is used in hit checking, the determination of the first hit check position is equivalent to the determination of the position of the other vehicle after the center of gravity (Q) of the other vehicle is moved at a relative speed for (1/60)/5 seconds. In this way, the second to fourth hit check positions can be determined. Because the fifth hit check position is the position of the other vehicle at which next time the game image will be displayed, it is not required to be calculated as a hit check position.

Figure 7:
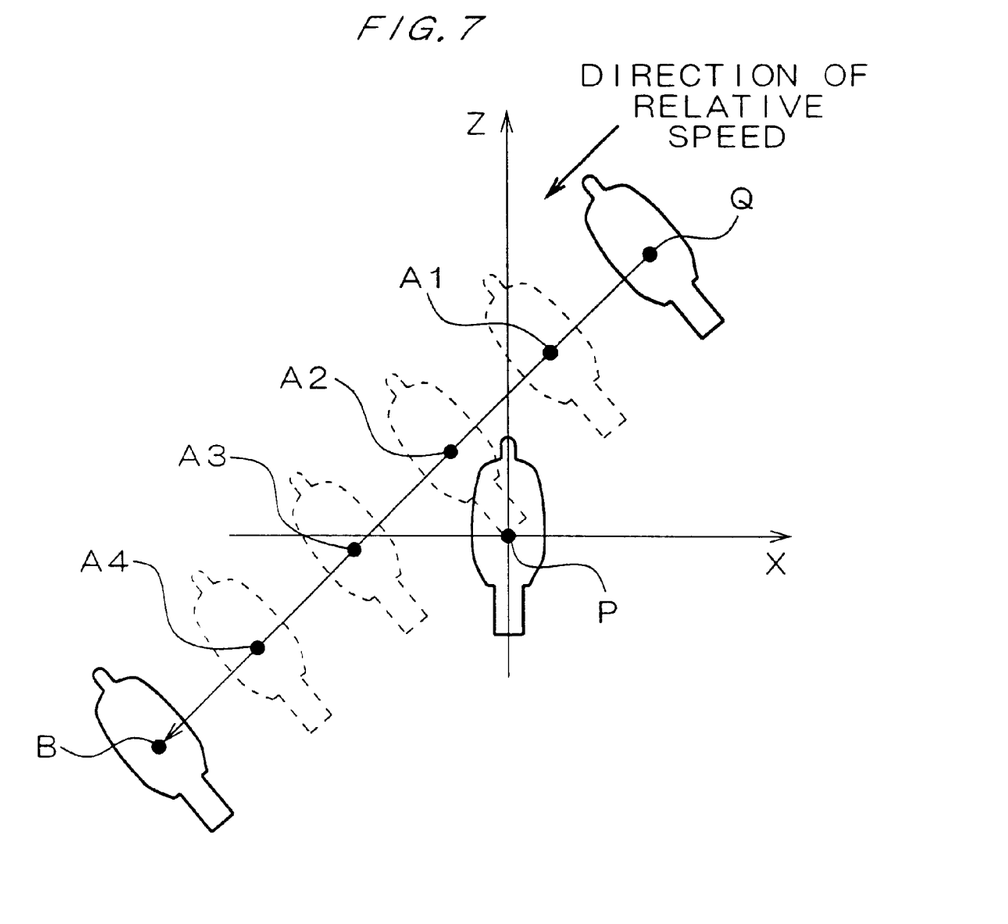
FIG. 7 shows a state in which the other vehicle is moved to a hit check position.

The hit check section 25 shown in FIG. 4 positions the center of gravity Q of the other vehicle at each hit check position decided by the hit check position decision section 23 to determine whether the player's vehicle collides with the other vehicle. For example, if five positions, that is, four segment positions A1 to A4 plus position B which the other vehicle reaches after traveling 1/60 seconds, are decided as hit check positions, the hit check section 25 positions the center of gravity of the other vehicle at each of the five hit check positions to perform collision determination (hit check) as shown in FIG. 7.

That is, besides hit checks at display intervals of the game image, hit checks can be performed at intermediate positions between display intervals of the game image. In addition, because the hit check positions are determined by dividing the distance traveled by the other vehicle at a relative speed with respect to the player's vehicle in 1/60 seconds into a predetermined number, unlike conventional approaches, the player's vehicle does not pass through the other vehicle because of the fast speed of the player's vehicle or the other vehicle, thereby allowing an accurate hit checking.

Figure 8:
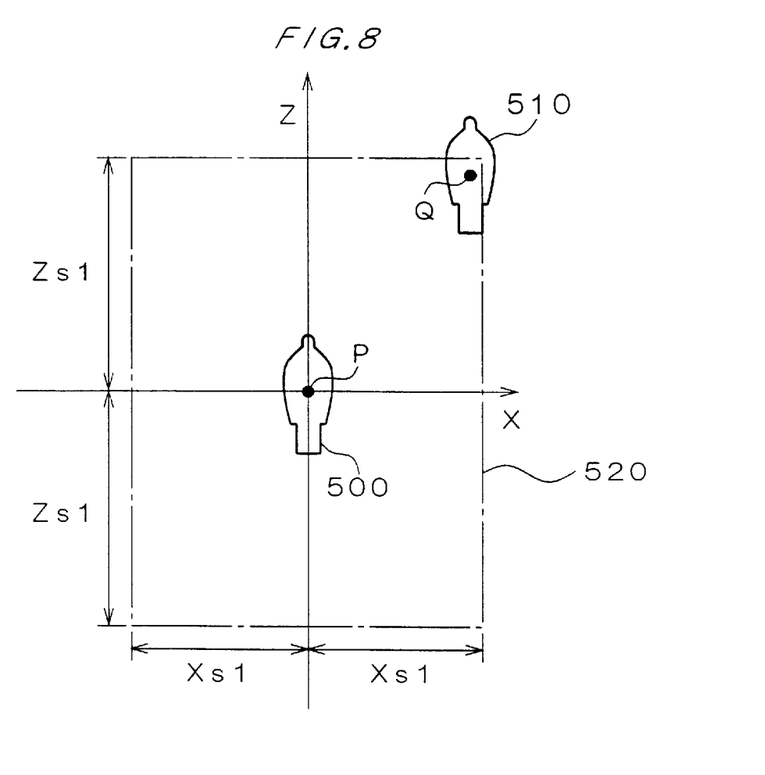
FIG. 8 is a drawing showing a principle for the first hit check.
Figure 9:
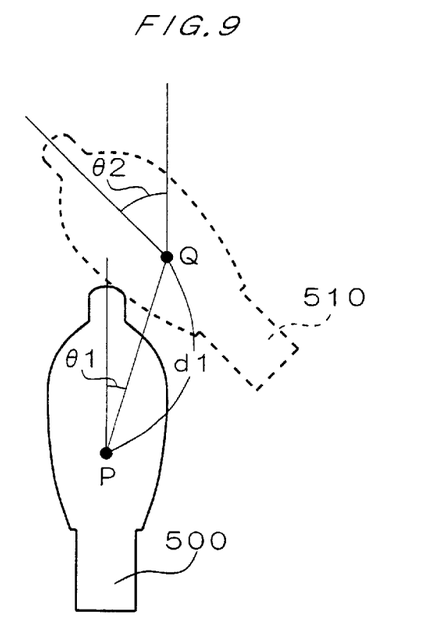
FIG. 9 is a drawing showing a principle for the second hit check.
Figure 10:
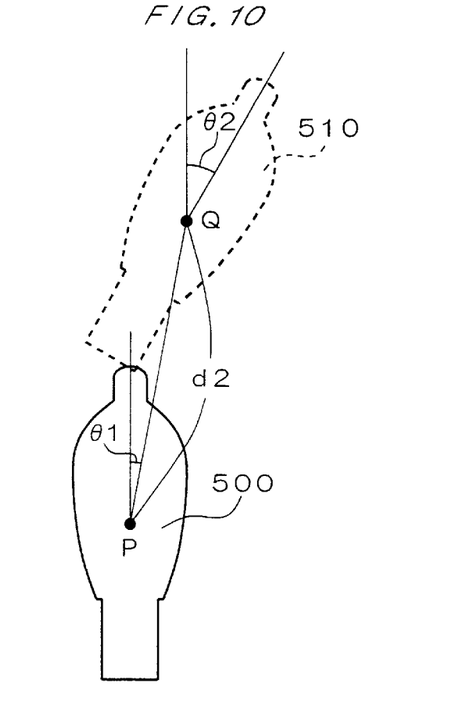
FIG. 10 is another drawing showing the principle for the second hit check.

FIGS. 8 to 10 show a principle for the hit checking. The hit check section 25 first performs the first hit check based on the positions of player's vehicle and the other vehicle at intervals of 1/60 seconds as shown in FIG. 8. In particular, the hit check section 25 sets a certain area (the first hit check zone) 520 centered at the center of gravity P of the player's vehicle 500. The size of the first hit check zone 520 is decided depending on an appropriate value such as the maximum speed of the player's vehicle 500 or the other vehicle 510, or the upper limit of the relative traveling speed of the other vehicle 510 with respect to the player's vehicle 500 and is specified by the reference value Xs1 along the X-axis and the reference value Zs1 along the Z-axis. The hit check section 25 calculates the distances along the X-axis and the Z-axis between the center of gravity P of the player's vehicle 500 and the center of gravity Q of the other vehicle 510. If the distance along the X-axis is smaller than the reference value Xs1 and the distance along the Z-axis is smaller than the reference value Zs1, that is, if the center of gravity Q of the other vehicle 510 is within the first hit check zone 520, the hit check section 25 determined that there is the possibility of a collision.

If the hit check section 25 determines that there is the possibility of a collision, it positions the center of gravity Q of the other vehicle each hit check position to perform the second hit check. In particular, the hit check section 25 calculates the orientation θ1 of the center of gravity Q of the other vehicle 510 with respect to the center of gravity P of the player's vehicle 500 and the orientation θ2 of the other vehicle 510, and the distance (distance between centers of gravity) d between the center of gravity of the player's vehicle 500 and that of the other vehicle 510.

The table memory 26 shown in FIG. 4 contains a collision distance data table. The collision distance data in this collision distance data table indicates the distance between centers of gravity at which the player's vehicle 500 collides with the other vehicle 510 when the orientation θ1 of the center of gravity Q of the other vehicle 510 with respect to the center of gravity P of the player's vehicle 500 and the orientation θ22 of the other vehicle 510 are identified.

For example, if the orientation θ1 of the center of the gravity Q of the other vehicle 510 with respect to the center of gravity P of the player's vehicle 500 and the orientation θ2 of the other vehicle 510 are identified as shown in FIG. 9, the player's vehicle 500 will collide with the other vehicle 510 when the distance between centers of gravity is smaller or equals to a distance of d1. On the other hand, if the orientation θ1 of the center of gravity Q of the other vehicle 510 with respect to the center of gravity P of the player's vehicle 500 and the orientation θ2 of the other vehicle 510 are identified as shown in FIG. 10, the player's vehicle 500 will collide with the other vehicle 510 when the distance between centers of gravity is smaller than or equal to a distance of d2 (>d1). In this way, the distance (collision distance) ds at which the player's vehicle 500 collides with the other vehicle 510 vary depending on the two orientation values θ1, θ2 and can be uniquely determined by identifying the two orientation values θ1, θ2.

Figure 11:
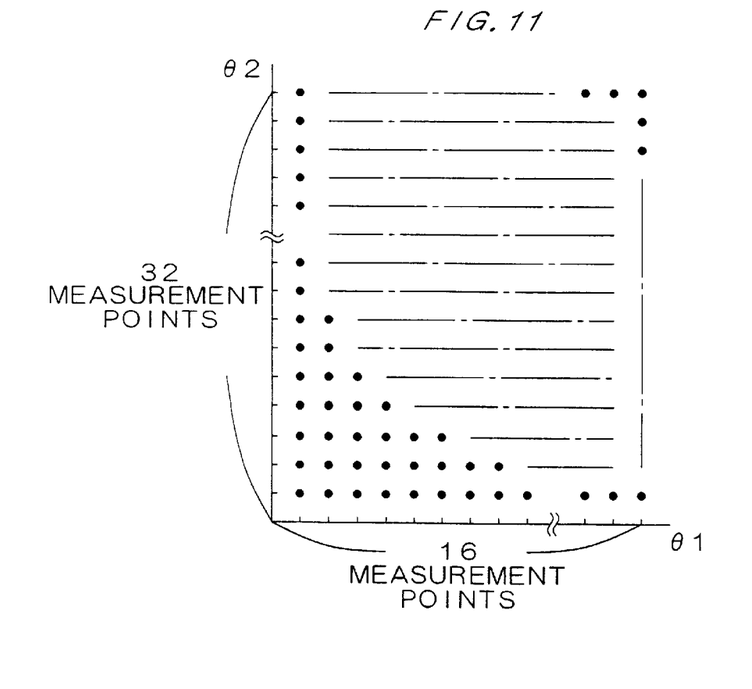
FIG. 11 shows a storage state of the table memory.

FIG. 11 shows a storage state of the memory table 26, and it shows a state in which the collision distances ds that is defined uniquely is stored. For example, if 32 measurement points are set for each of the values θ1, θ2, collision distances ds at 32×32=1024 measurement points can be obtained by combining the measurement points of θ1 and θ2. Because the motorcycles in this embodiment have a symmetrical shape, measurement points of θ1 are not required to be set throughout the 360-degree area, instead, they are required to be set in an only 180-degree area. Therefore, collision distances ds corresponding to 16×32= 512 points, which are the combinations of the measurement points of θ1 and θ2, are contained in the table memory 26 as shown in FIG. 11.

The hit check section 25 calculates the orientation 61 of the center of gravity Q of the other vehicle 510 with respect to the center of gravity P of the player's vehicle 500 and the orientation θ2 of the other vehicle 510 and searches the collision distance table using these two orientation values θ1, θ2 as parameters to find a collision distance ds. The hit check section 25 compares the collision distance ds with the distance between centers of gravity d. It determines that the player's vehicle 500 will collide with the other vehicle 510 if the distance between centers of gravity d is smaller than the collision distance ds, or determined that the player's vehicle 500 will not collide with the other vehicle 510 if the distance between centers of gravity d is greater than the collision distance ds.

If the hit check section 25 determines that the player's vehicle 500 will collide with the other vehicle 510, it specifies representation on a collision of the player's vehicle 500 collides with the other vehicle 510 based on the orientation θ1 of the center of gravity Q of the other vehicle 510 with respect to the center of gravity P of the player's vehicle 500 and the orientation θ2 of the other vehicle 510. For example, when the right forward part of the player's vehicle 500 collides with the left side of the other vehicle 510 as shown in FIG. 9 a counter clockwise force is applied to the player's vehicle 500 to produce a situation in which the vehicle goes out of control or spins.

Figure 12:
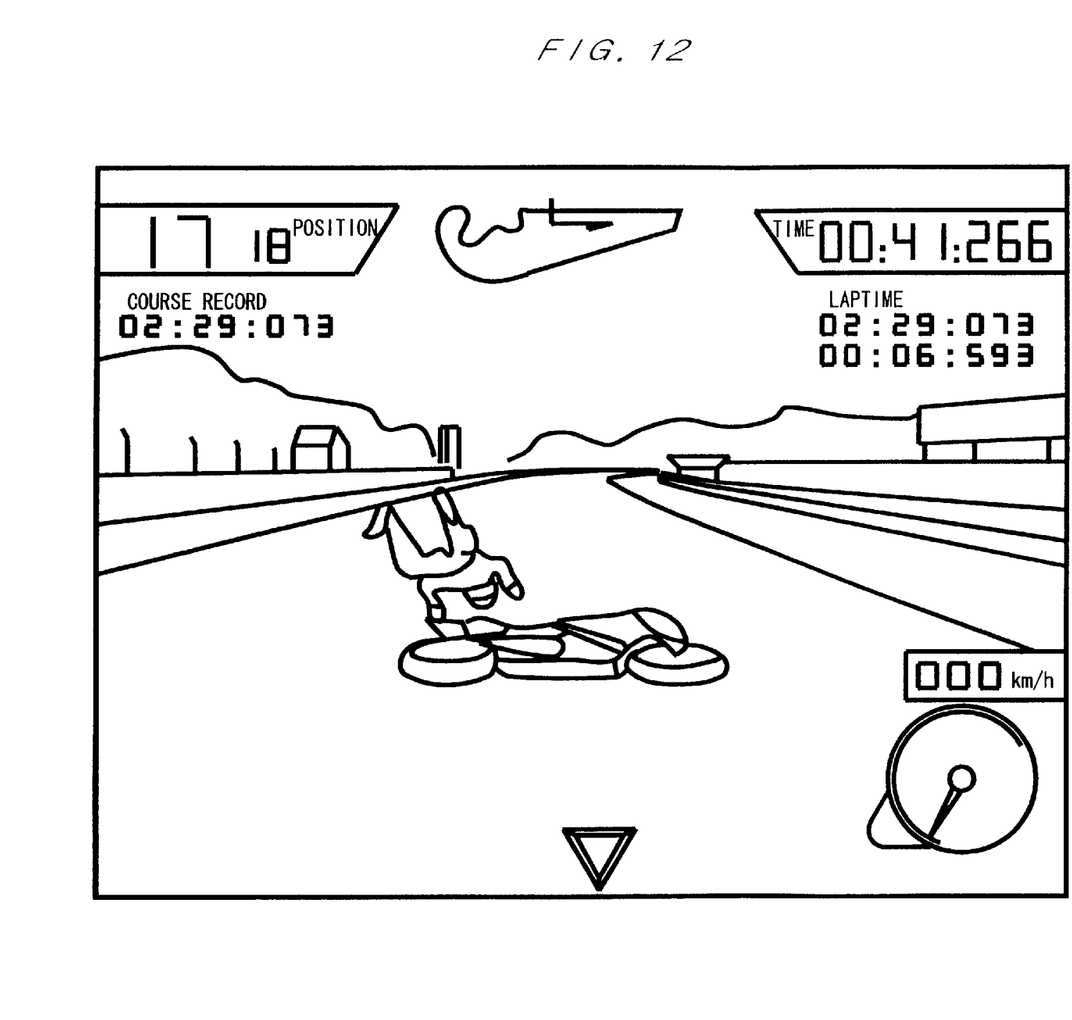
FIG. 12 shows an example of a game image after a collision occurs.

The table memory 26 contains, besides the collision distance data table described above, a collision representation data table for identifying a representation on collision. This collision representation data table contains data on representations with parameters of the orientation θ1 of the center of gravity Q of the other vehicle 510 with respect to the center of gravity P of the player's vehicle 500 and the orientation θ2 of the other vehicle 510. The hit check section 25 searches this collision representation table based on calculated values of orientation θ1, θ2 to identify a representation to be performed on collision. The image generation section 40 generates a game image reflecting the identified representation data to display the game image as shown in FIG. 12 on the display 50.

The hit check section 25 decreases a count value of the counter 24 by one each time it positions the center of gravity of the player's vehicle 500 at a hit check position to perform hit checking.

The above-described manipulation unit 10 corresponds to the manipulation unit, the game operation section 20 corresponds to the game operation unit, the image generation section 40 and the display 50 corresponds to the game image display unit, the relative speed calculation section 22 corresponds to the relative speed calculation unit, the hit check position decision section 23 corresponds to the collision determination position decision unit, and the hit check section 25 corresponds to the collision determination unit.

Figure 13:
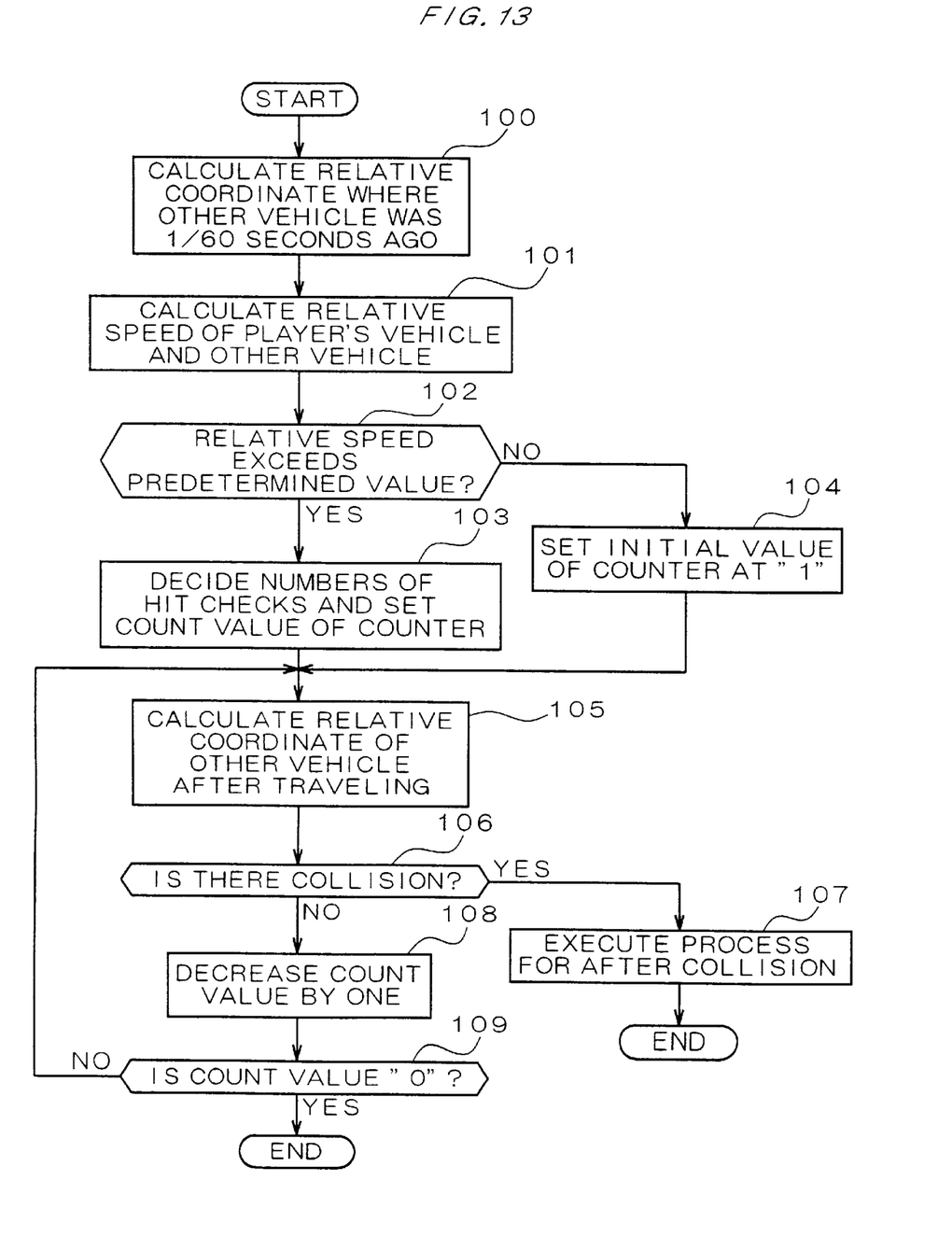
FIG. 13 is a flowchart showing an operation procedure during a hit check in the game apparatus according to the embodiment.

The game apparatus 100 of this embodiment has the above-mentioned configuration and its operation will be described below. FIG. 13 is a flowchart of an operation procedure performed by the game apparatus 100 of the embodiment during hit checking and shows mostly operations within the game operation section 20. It is assumed that the first hit check describe above has been completed, obstacles (other vehicles) to be subject to the second hit check have been narrowed down to a certain extent, and the second hit check will be performed to these vehicles.

The relative coordinate calculation section 21 calculates the relative coordinates where the other vehicle was 1/60 seconds ago using a local coordinate system centered at the player's vehicle (step 100). The relative speed calculation section 22 calculates the relative speed of the player's vehicle and the other vehicle based on the calculated relative coordinate where the other vehicle was 1/60 seconds ago and the relative coordinates where the other vehicle is to be positioned at the next display interval 1/60 seconds after (step 101).

The hit check position decision section 23 determines whether the calculated relative speed exceeds a predetermined value (step 102). If the relative speed exceeds the predetermined value, then the hit check position decision section 23 determines the count n of hit checks by dividing the distance traveled by the player's vehicle at the relative speed in 1/60 seconds into n segments and set the count n of hit checks as the initial count value of the counter 24 (step 103). For example, if the distance traveled by the player's vehicle from the origin in 1/60 seconds is 4.5L as shown in FIG. 6, the hit check position decision section 23 determines, as the count n of hit checks, a value of "5" which is the minimum number of segments when the distance 4.5L is equally segmented so as not to exceed the length L of the player's vehicle and sets the count of the counter 24 at "5."

If the relative speed is lower than the predetermined value, the hit check position decision section 23 a value of "1" is set as the initial count value of the counter 24 (step 104) without performing the segmentation shown at step 103.

After the count value of the counter 24 is set at step 103 or 104, the hit check section 25 calculates the relative coordinates of the other vehicle corresponding to the first hit check position after traveling (step 105), and then determines whether the player's vehicle collides with the other vehicle (hit or not) by referencing the collision distance data table stored in the table memory 26 (step 106). In the example shown in FIG. 7, the first hit check position is set at the segment position A1 nearest to the position of the other vehicle at the previous display interval and a hit check is performed. If the player's vehicle collides with the other vehicle, the hit check section 25 references the collision representation data table stored in the table memory 26 to execute the process for after the collision (step 107).

If there is no hit (if the result of the step 106 is negative), the hit check section 25 decreases a count value of the counter 24 by one (step 108) and determines whether the count value is "0" or not (step 109). If the count value is "0," then the sequence of the hit checking ends because the value "0" indicates that collision determination at all the hit check positions is completed. If the count value is not "0," then the hit check section 25 calculates the relative coordinates of the other vehicle corresponding to the next hit check position (step 105) and repeats the step for determining if there is a hit or not (step 106) and subsequent steps.

In this way, if the relative speed of the player's vehicle and the other vehicle is higher than a predetermined value, the game apparatus 100 of this embodiment determines the count of hit checks by dividing the distance traveled by the player's vehicle at the relative speed in a display interval into segments so that the distance does not exceed the length L of the player's vehicle and performs one or more hit checks at an intermediate position(s) on the travel trajectory of the player's vehicle and the other vehicle. Thus, a situation is avoided in which the player's vehicle passes through the other vehicle even though the player's vehicle actually collides with the other vehicle while the player's vehicle or the other vehicle is traveling fast, thereby allowing an accurate hit checking.

In addition, while in the game apparatus 100 of the embodiment the number of hit checks increases, processes such as those for calculating the relative speed of the other vehicle using a local coordinate system of the player's vehicle are common to every hit checks, therefore there is no considerable increase in process load.

Furthermore, the embodiment only adds hit check positions between continuous display intervals without making any changes to an algorithm for basic hit checking, thereby allowing more realistic effects after collision to be presented.

The present invention is not limited to the embodiment described above. Various variations thereof may be implemented within the scope of the present invention. For example, while the present invention has been described with respect to hit checks in the case where the player's vehicle collides with another vehicle, the present invention can be applied to the case where the player's vehicle collides with a stationary obstacle such as a side wall. In addition, while the embodiment has been described with respect to the game apparatus for a motorcycle racing game, the present invention can be applied to other game apparatus for other games such as a motorcar racing game.

While in the embodiment described above, initially it is determined whether the relative speed of the player's vehicle and the other vehicle exceeds a predetermined value (step 102 in FIG. 13), the determination may be omitted. In such a case, if the relative travel distance of the player's vehicle from the previous display interval to the next display interval is smaller than the length L of the player's vehicle because the relative speed of the player's vehicle and the other vehicle is low, the initial count value of the counter 24 is set at "1" without performing hit checking in an intermediate position(s). Furthermore, instead of determining whether the relative speed of the player's vehicle and the other vehicle exceeds a predetermined value, how much the relative coordinate of the other vehicle was changed from the previous interval to the next interval may be determined, and whether the amount of change (corresponding to the relative travel distance of the other vehicle or the player's vehicle) exceeds a predetermined value may be determined.

While in the embodiment described above, the number and positions of hit checks are determined by segmenting the distance into the minimum number of segments to the extent that the length of each segment does not exceed the length L of the player's vehicle, the length of the segment may be made shorter to increase the number of hit checks.

INDUSTRIAL APPLICABILITY

As described above, according to the present invention, game operation unit determines a collision of a player's moving object with an obstacle at an intermediate position between a position corresponding to the time at which a game image was previously displayed and a position corresponding to the time at which the image will be displayed next, during the travel of the player's moving object manipulated by using manipulation unit. Thus, even if the player's moving object collides with an obstacle at an intermediate position between the previous and the next display time of the player's moving object rather than at the previous display time and next display time of the player's moving object, while the player's moving object is traveling fast, an accurate determination of the collision can be accomplished.

What is claimed is:

1. A game apparatus, comprising:

manipulation unit for manipulating a player's moving object;

game operation unit for calculating a virtual game space in which said player's moving object moves; and game image display unit for displaying the game image in said game space, wherein said game operation unit determines whether a collision of said player-operated unit with an obstacle has occurred or not, said collision determination being performed at an intermediate position between a position corresponding to the previous display time of said game image and a position corresponding to the next display time of said game image.

2. The game apparatus according to claim 1, wherein said game operation unit comprises:

collision determination position decision unit for calculating the relative coordinate data of said player's moving object and said obstacle used for one or more collision determinations performed at said intermediate position, based on a relative distance traveled by said player's moving object and said obstacle in relation to display intervals of said game image; and collision determination unit for determining a collision of said player's moving object with said obstacle by using said relative coordinate data calculated by said collision determination position decision unit.

3. The game apparatus according to claim 2, wherein:

said game operation unit further comprises relative speed calculation unit for calculating the relative speed of said player's moving object and said obstacle; and said collision determination position decision unit calculates said relative coordinate data corresponding to said intermediate position when said relative speed calculated by said relative speed calculation unit exceeds a predetermined value.

4. The game apparatus according to claim 3, wherein:

said game operation unit further comprises a table memory for storing a collision distance ds used for determining whether said player's moving object and said obstacle collide or not, in relation to the orientation θ1 in which said obstacle exists with respect to the direction in which said player's moving object faces and the orientation θ2 of said obstacle with respect to direction in which said player's moving object faces; and said collision determination unit determines that said player's moving object collides with said obstacle if the distance between said player's moving object and said obstacle subject to a collision does not exceed said collision distance ds corresponding to said orientations θ1, θ2.

5. The game apparatus according to claim 1, wherein said obstacle is a movable object other than said player's moving object.

6. The game apparatus according to claim 1, wherein said game operation unit extracts said obstacle included in a predetermined area centered at said player's moving from obstacles in said virtual game space and determines a collision of said player's moving object with said extracted obstacle.

7. The game apparatus according to claim 6, wherein said predetermined area for extracting said obstacle subject to the collision determination is established by taking at least one of said player's moving object and said obstacle into consideration.

8. A collision determination method, comprising the steps of:

calculating the relative coordinate data of a player's moving object and an obstacle used for one or more collision determinations, wherein said collision determinations are performed at one or more intermediate positions between a position corresponding to the previous display time of said game image and a position corresponding to the next display time of said game image, based on a relative distance traveled by said player's moving object and said obstacle in relation to display intervals of said game image; and determining whether a collision of said player's moving object with said obstacle has occurred based on said relative coordinate data.

9. An information storage medium, containing a program for determining a collision of a player's moving object and an obstacle, wherein said program displays a game image at a previous display time and at a next display time, wherein said determining is performed at an intermediate position between a position corresponding to the previous display time of said game image and a position corresponding to the next display time of said game image.

10. The information storage medium according to claim 9, wherein said program comprises:

a first program for calculating the relative coordinate data of a player's moving object and an obstacle used for one or more collision determinations performed at an intermediate position between a position corresponding to the previous display time of said game image and a position corresponding to the next display time of said game image, based on a relative distance traveled by said player's moving object and said obstacle in relation to display intervals of said game image; and a second program for determining a collision of said player's moving object with said obstacle based on said relative coordinate data.

* * * * *